3,468,813
Patented Sept. 23, 1969

3,468,813
METHOD OF PRODUCING ACID SILICA SOLS

Morris Mindick, Claredon Hills, and Lewis E. Reven, La Grange Park, Ill., assignors to Nalco Chemical Company, Chicago, Ill., a corporation of Delaware
No Drawing. Filed Sept. 13, 1965, Ser. No. 487,058
Int. Cl. B01j 13/00
U.S. Cl. 252—313     2 Claims

ABSTRACT OF THE DISCLOSURE

This invention is concerned with producing concentrated silica sols by a process comprising passing a concentrated alkali metal silicate solution through a bed of hydrogen form cation exchange resin at a reduced temperature and a high flow rate.

---

This invention relates to the production of acid silica sols from alkali metal silicate solutions by ion exchange and to the products thereof. More particularly, the invention relates to improvements in the production of high silica content acid silica sols, that reduce gelling and silica losses occasioned thereby, increase production efficiency, and provide novel sols having hitherto unattained silica contents for unconcentrated or initial products of ion exchange.

Acid silica sols produced directly in relatively high silica concentrations by ion exchange are useful in at least two significant ways. One important use is as a starting material in the production of highly concentrated alkaline silica sols of various particle sizes for various uses, by methods such as described in U.S. Patent No. 2,574,902 and U.S. Patent No. 2,929,790. The ultimate products are used, for example, as textile delusterants, antislip agents, and modifiers for elastomers and plastics. In this use of the acid sols, it is most advantageous to employ relatively highly concentrated acid sols, inasmuch as substantial increases in evaporator capacity, savings in evaporation cost, and increased production are effected. Another important use for the acid silica sols of high silica content is as binders for ceramic materials, as described in Canadian Patent No. 623,562 to Raymond Reuter. In this application, it is most desirable that the acid sols be employed in unconcentrated form, as initially produced, inasmuch as the sol properties change and the sols become substantially inferior when they are concentrated by evaporation.

U.S. Patent No. 2,244,325 to Paul G. Bird discloses a method of producing a colloidal silica sol by passing an alkali metal silicate feed solution having an $SiO_2$ or silica content of about 3% through a cation exchange material bed in the hydrogen form at a flow rate of about 1 gallon per minute per square foot of bed cross sectional area. The product is an acid silica sol having about the same silica content as the feed solution. In utilizing this method, it was found that when it was attempted to employ more concentrated feed solutions in order to produce more concentrated acid sols, gelling and other problems were encountered.

The aforesaid Reuter Canadian Patent No. 623,562 discloses the production of relatively highly concentrated acid silica sols useful as binders for ceramic materials. Alkali metal silicate feed solutions containing 7–15% silica are passed through a bed of a strong acid cation exchange resin in the hydrogen form to produce acid sols having a silica content of 6–8%. The feed solutions are passed through the exchange resin at rates of 3–7 gallons per minute per square foot of resin area, and higher flow rates may be used. The method is conducted at initial temperatures of from 67° F. to 125° F., preferably 75° F. to 80° F. The product sols are alkalized to pH 10.5 or higher for use as ceramic binders. The method has the disadvantage that silica losses are high due to gelling. A further disadvantage of the method is that the resin bed is coated and becomes plugged with silicate, necessitating a caustic rinse following the exchange operation.

Patent application Ser. No. 257,643, filed Feb. 11, 1963, by Eugene J. Klosak, and now abandoned, discloses an improved method of producing relatively highly concentrated acid silica sols by passing alkali metal silicate feed solutions containing 5–8% silica through a cation exchange resin bed in the hydrogen form at flow rates of about 4–4 gallons per minute per square foot of resin area. The acid silica sol effluent is collected until the ion exchange capacity of the resin has been exhausted, as indicated by a first drop in conductivity of the sol effluent. The flow of silicate solution is terminated, and the resin is backwashed with water. The resin is regenerated with a mineral acid to a cation exchange capacity of at least 60% based on its original efficiency. The resin next is rinsed with soft water. The method steps may be repeated in a continuous manner over a number of cycles.

In commercial use, the foregoing method of the Klosak application has been conducted with feed silicate solutions having silica contents of about 6% and at flow rates of about 9 gallons per minute per square foot of resin area, to produce acid silica sols having about the same silica contents as the feed solutions. The resin bed normally is rinsed with sodium hydroxide solution after each 200 cycles of operation. While the process has been suitable for commercial operation, difficulties have, nevertheless, been experienced due to gelling in the resin bed, leading to plugging and rinsing problems. Such difficulties interfere with production and increase the costs of labor and materials. In view of these difficulties, the concentration of the feed silicate solution has been held to a maximum of about 6% silica.

The present invention overcomes the problems previously encountered in producing high silica content acid silica sols from alkali metal silicate solutions by ion exchange, and provides an improved method for producing acid silica sols having $SiO_2$ contents of about 6% to 12% by weight. The invention also provides novel high silica content acid sol products of enhanced utility, having $SiO_2$ contents of about 9% to 12% by weight. Production is markedly improved, and the cost of producing comparable products is reduced. Where the new acid sols containing 9–12% of $SiO_2$ are employed as starting materials for the production of more concentrated alkaline sols, as described above, evaporation costs proportional to the increased silica content are saved and equipment requirements are reduced. Where the new acid sols are employed as binders for ceramic materials, they produce harder and stronger binders.

In accordance with the invention, an acid silica sol having a content of about 6% to 12% by weight of $SiO_2$, also referred to herein as the silica content, is produced while minimizing gelation of silica and the problems occasioned thereby, by passing an aqueous solution of an alkali metal silicate having an $SiO_2$ content of about 6% to 12% by weight corresponding to the desired content of the acid sol through a strong acid cation exchange resin bed in the hydrogen form under refrigeration conditions and/or at a high flow rate. Preferably, the conditions are selected to limit the gelation of silica to a maximum of 2% of the silica content of the feed silicate solution, and where desirable, to substantially prevent gelation.

It has been discovered that gelation of silica can be limited at the relatively high silica concentrations by maintaining a suitably low temperature in the exchange zone of the resin bed, which ordinarily increases in temperature during exchange and is the zone of highest temperature. The required temperatures necessitate refrigeration at least during the warmer months of the year, when the water supply is correspondingly warmer. During the colder months, the available water may be sufficiently cold for conducting the process at a desired low temperature without refrigeration. It is found that for each degree Fahrenheit that the maximum exchange bed temperature is reduced, the silica concentration of the feed solution and of the acid sol product may be increased approximately 0.05% without increased gelation. Thus, the concentration may be increased 0.5% for each reduction in temperature of 10° F. Similarly, where gelation is greater than desirable under given conditions of silica concentration, temperature, and flow rate, it may be reduced to acceptable limits or substantially prevented by lowering the temperature in the exchange zone.

Refrigeration conditions as contemplated in the present invention may be provided by artificial refrigeration of the feed silicate solution or the materials used to make up the solution, the exchange resin bed, or both. The materials and the bed may be precooled and/or cooled during operation. In order to establish suitably low temperatures, freezing point depressants may be incorporated in the feed silicate solution, including such water miscible organic liquids as the glycols and alkanols, in particular, ethylene glycol, propylene glycol, methano, and ethanol.

It has aso been discovered that gelation of silica can be limited at the relatively high silica concentrations by passing the feed silicate solution through the exchange zone of the resin bed at a suitably high flow rate, corresponding to a relatively low residence time of the solution in the exchange zone. It is found that the silica concentration of the feed silicate solution and of the acid sol product may be increased approximately proportionately to the square root of the flow rate, or approximately proportionately to the reciprocal of the residence time in the exchange zone, without increased gelation. The allowable increase in concentration is on the order of magnitude of about 0.1% for an increase in flow rate of 5 gallons per minute per square foot of bed cross sectional area at the lower flow rates, and the concentration may be increased at a decreasing rate as the flow rate is increased. Similarly, the flow rate may be increased and the residence time in the exchange zone decreased to reduce or prevent gelation where it is excessive at given conditions of silica concentration, bed temperature, and flow rate.

Silica gelation also may be limited by a combination of low temperature conditions and a high flow rate. The selection of the particular method to be employed for producing the acid silica sols of high silica concentration will frequently be based upon economic considerations and the availability of equipment. At the lower silica concentrations, it may be most desirable to merely operate at a high flow rate, or at a high flow rate in combination with a small degree of refrigeration. At the higher concentrations, it is preferable to employ refrigeration, with or without a high flow rate.

When operating according to the new method, the temperature in the exchange bed may be lowered as far as desired, so long as the silicate is kept in solution. The minimum flow rate preferably is at least about 6 gallons per minute per square foot of bed cross sectional area at the lower bed temperatures, and preferably at least about 17 gallons per minute per square foot of bed area when the bed is at ambient temperatures, especially as encountered in the warmer months of the year, or at somewhat reduced temperatures. The flow rate may be increased to 100 gallons per minute per square foot of bed area, preferably, or higher, depending upon economic and operational factors.

The novel acid silica sol products of the invention having a silica content of about 9% to 12% by weight are produced according to a preferred embodiment of the invention by passing an aqueous solution of an alkali metal silicate having a silica content of about 9% to 12% by weight through the cation exchange resin bed at a flow rate of from about 6 to about 100 gallons per minute per square foot of bed area and correspondingly at a maximum bed temperature of from about 84° F. at 9% solution to about 24° F. at 12% solution, at 6 gallons per minute, to from about 120° F. at 9% solution to about 60° F. at 12% solution, at 100 gallons per minute. In a specific preferred embodiment, an acid silica sol having a silica content of about 10% is prepared by passing a silicate solution having a silica content of about 10% through the cation exchange resin bed at a flow rate of at least about 10 gallons per minute per square foot of bed area and at a maximum bed temperature of about 75° F.

The acid silica sol product will have substantially the same but slightly less silica concentration than the feed silicate solution. There is a slight drop in concentration, about 0.1%, due to water formation and exchange resin shrinkage with release of water from the resin. An additional drop in the concentration may result from a corresponding tolerable amount of gelation. As set forth above, it is preferred to limit the gelation of silica to a maximum of about 2% of the silica content of the feed solution.

While the cation exchange resin bed and the exchange zone thereof are referred to above and subsequently, it appears that the most significant or critical region of the bed is that portion of the exchange zone where the pH of the solution flowing therethrough is about 5 to 7.5. That is, the temperature and flow rate or residence time conditions in this region of changing pH are most significant as regards gelation and the prevention of gelation. The exchange resin bed referred to herein contemplates the usual compact or unexpanded resin column through which a solution is passed. It is also contemplated that the method may be carried out in an expanded or fluidized bed, in which case the specific flow rates are adjusted to take into account the differences in void spaces in the bed.

Of the alkali metal silicates, sodium silicate is most readily available and preferred, although other silicates may be employed. Sodium silicate is available in aqueous solutions containing about 28% $SiO_2$. The silicate solution preferably has a very low $Na_2O:SiO_2$ ratio, e.g., about 1:3 or lower. This solution is diluted with soft or deionized water to the desired $SiO_2$ concentration for the feed solution, i.e., about 6% to 12% by weight.

The strong acid cation exchange resin is an acid-regenerable resin, preferably of the sulfonic acid type. Typical preferred resins are Dowex HCR and Nalcite HCR, sulfonated styrene divinylbenzene copolymers prepared as described in U.S. Patent No. 2,366,007. Another suitable resin is commercially identified as Amberlite IR–120.

The method of the invention is conducted according to the procedure described in the aforesaid Klosak application, with the improvements in temperature control and flow rate described herein. In particular, an aqueous sodium silicate feed solution having an $SiO_2$ content of about 6% to 12% by weight is prepared by dilution with soft water of a more concentrated commercial sodium silicate solution, such as described above. The feed solution is passed through a bed or column of the strong acid cation exchange resin in the hydrogen form. The solution is passed through the bed in downflow but may be passed through the bed in upflow if desired. Preferably, the feed solution is cooled by artificial refrigeration prior to or during its transfer to the bed, where control by refrigeration is employed. The resin bed may be precooled, such as by means of a cold wash or by cooling elements in the bed, or the bed and solution therein may be cooled during operation by cooling elements therein. It has been found that the temperature rise during operation or exhaustion of the resin is about 10° F. at 5% silica concentration and increases at increasing concentrations, being about 30° F. at 10% silica concentration. It is convenient to monitor the maximum bed temperature where the solution is discharged from the resin bed, but suitable temperature indicators may be provided in the bed.

The feed solution is pumped through the bed at a selected rate in the range of about 6 to 100 gallons per minute per square foot of bed area. The first effluent constitutes the rinse water previously present in the bed, and it is discarded. Thereafter, acid silica sol product is collected until the exchange capacity of the resin has been exhausted. This is indicated by the first drop in conductivity of the effluent. The exchange operation or exhaustion of the resin is discontinued when the conductivity reaches a minimum following such first drop in conductivity. The acid silica sol product produced in this matter has a pH of preferably 2.5 to 4.0. This acidity is due to salt impurities which are converted to their acids in the ion exchange step.

The resin is placed in condition for subsequent operation by first passing water through the bed to remove sodium silicate, which may be collected and reused. The bed then is backwashed with water to remove substantially all unreacted sodium silicate on the resin and to loosen the bed. Washing is continued until the effluent has an alkalinity below about 25 grains per gallon, preferably between 5 and 10 grains per gallon, expressed as $CaCO_3$.

The resin is regenerated with a mineral acid to a cation exchange capacity of at least 60%, preferably 65% to 75% of its original capacity. The acid may be any mineral acid, and it is preferably dilute, e.g., from 3% to 8% concentration. A preferred acid is sulfuric acid.

The resin then is rinsed with soft water to remove the acid. Rinsing is continued until the acidity of the effluent is reduced below about 20 grains per gallon, preferably between 5 and 15 grains per gallon expressed as $CaCO_3$. The resin bed then is in condition for further operation, and fed silicate solution may be supplied thereto for ion exchange to produce acid silica sol.

Proceeding according to the present invention, the operating cycle may be repeated many times in continuous operation. Thus, for example, about 200 cycles of operation may be conducted between caustic rinses to remove accumulated gel. However, it may be desirable and economic to operate up to the aforesaid maximum gelling of 2% of the feed solution silica content, at which condition a caustic rinse may be desirable after each 5–10 runs.

The following example is illustrative of the invention. It will be understood that the invention is not limited to the example or to the conditions, proportions, materials and procedures set forth therein. In the examples, the proportions are by weight unless otherwise specified.

EXAMPLE I

An aqueous solution of sodium silicate was prepared from commercial sodium silicate having a specific gravity of 1.4, containing approximately 28% $SiO_2$, and having an $Na_2O:SiO_2$ ratio of 1:3.25. The solution was diluted with deionized water to provide a feed silicate solution containing 10% $SiO_2$ and 3.1% $Na_2O$.

A strong acid cation exchange resin bed was provided in a 2″ diameter Lucite column having an area of 0.0217 square foot. The column was filled to a depth of 22 inches, providing a resin bed volume of 0.04 cubic foot. The resin was a sulfonated styrene divinylbenzene copolymer cation exchange resin prepared as described in U.S. Patent No. 2,366,007 (Dowex HCR). The resin had a total capacity of 1.83 milliequivalents per milliliter, a water holding capacity of 53.8%, and a swelling value from the sodium form to the hydrogen form of 6.5%. For each run described below, fresh resin was used.

The feed silicate solution was refrigerated and the resin bed was precooled by passing refrigerated water both to 45° F. The feed solution was passed through the resin bed downflow at a flow rate of 11 gallons per minute per square foot of bed cross sectional area. The temperature of the acid silica sol effluent rose to a peak temperature of 73° F. The water initially present in the bed was displaced by the feed solution and discarded, after which the acid silica sol effluent was collected until a minimum conductivity was reached following the first drop in conductivity of the effluent. The bed then was rinsed with water to remove the silicate remaining therein.

The acid silica sol produced in the foregoing manner had a specific gravity of 1.060, corresponding to a silica content of 9.8%. This represents a drop in concentration of about 0.1% due to water formation and resin shrinkage with release of water, and about a 0.1% drop due to gel formation. The resin bed was clean and free flowing, and thus suitable for reuse in the same manner over many cycles.

Another run was conducted in the manner of the foregoing run with the feed solution and the resin bed precooled to 46° F., and the feed solution flow rate was 6 gallons per minute per square foot of resin area. The temperature of the acid silica sol effluent rose to 74° F. during the run.

The acid sol product of the run at 6 gallons per minute had a pH of 2.7 and a specific gravity of 1.055, corresponding to a silica content of 8.9%. The resin bed was loosely gelled and broke up during backwashing. The loss of 10% of the silica content of the feed solution was excessive for a practical process, and the amount of gelation would require excessive caustic rinsing for repeated use of the resin. The results demonstrated that the flow rate was inadequate at the temperature of the run, and either a greater flow rate, a lower temperature, or a combination of both was necessary for acceptable results such as obtained in the first-described run.

A third run was made in the same manner, except that the feed silicate solution and the resin bed were at a temperature of 75° F. and were not precooled. The feed solution was passed through the bed at a flow rate of 14.2 gallons per minute per square foot of bed area. The peak temperature reached in the effluent during the run was 105° F.

The acid silica sol product had a pH of 2.4 and a specific gravity of 1.052, corresponding to 8.5% $SiO_2$. The resin was loosely gelled and readily broken up. The loss of about 15% of the feed solution silica was excessive for a practical process. The results demonstrated that the higher feed rate of 14.2 gallons per minute was insufficient for a practical process in the absence of bed cooling, and that a greater flow rate and/or a lower bed temperature were necessary for a practical process.

The invention thus provides a new and improved method of producing acid silica sols directly in high silica concentrations. The new method is very advantageous for commercial production, enabling substantially gel-free operation with long continued reuse of the ion exchange resin. Novel acid sol products containing 9% to 12% silica are provided, which are especially useful in the production of more highly concentrated and increased particle size products and as ceramic binders.

We claim:
1. A method of producing an acid silica sol which comprises passing an aqueous solution of an alkali metal silicate having an $SiO_2$ content of about 9% to 12% by weight through a strong acid cation exchange resin bed in the hydrogen form at a flow rate of from about 6 to about 100 gallons per minute per square foot of bed cross sectional area and correspondingly at a maximum bed temperature of from about 84° F. at 9% solution to about 24° F. at 12% solution, at 6 gallons per minute, to from about 120° F. at 9% solution to about 60° F. at 12% solution, at 100 gallons per minute.

2. A method of producing an acid silica sol which comprises passing an aqueous solution of an alkali metal silicate having an $SiO_2$ content of about 10% by weight through a strong acid cation exchange resin bed in the hydrogen form at a flow rate of at least about 10 gallons per minute per square foot of bed cross sectional area and at a maximum bed temperature of about 75° F.

References Cited

UNITED STATES PATENTS

| | | | |
|---|---|---|---|
| 2,588,389 | 3/1952 | Iler | 252—313 |
| 3,083,167 | 3/1963 | Shannon | 252—313 |

RICHARD D. LOVERING, Primary Examiner

US. Cl. X.R.

106—69

PO-1050
(5/69)

UNITED STATES PATENT OFFICE
CERTIFICATE OF CORRECTION

Patent No. 3,468,813      Dated September 23, 1969

Inventor(s) Morris Mindick et al

It is certified that error appears in the above-identified patent and that said Letters Patent are hereby corrected as shown below:

Column 2, line 15, "4-4" should read "4-14".

Column 3, line 30, "methano" should read --methanol--; line 31, "aso" should read --also--.

SIGNED AND
SEALED
APR 28 1970

(SEAL)
Attest:

Edward M. Fletcher, Jr.
Attesting Officer

WILLIAM E. SCHUYLER, JR.
Commissioner of Patents